Sept. 12, 1939. A. S. REID 2,172,595
CONTROL VALVE FOR HYDRAULICALLY OPERATED MACHINE TOOLS
Filed Dec. 17, 1937 5 Sheets-Sheet 3
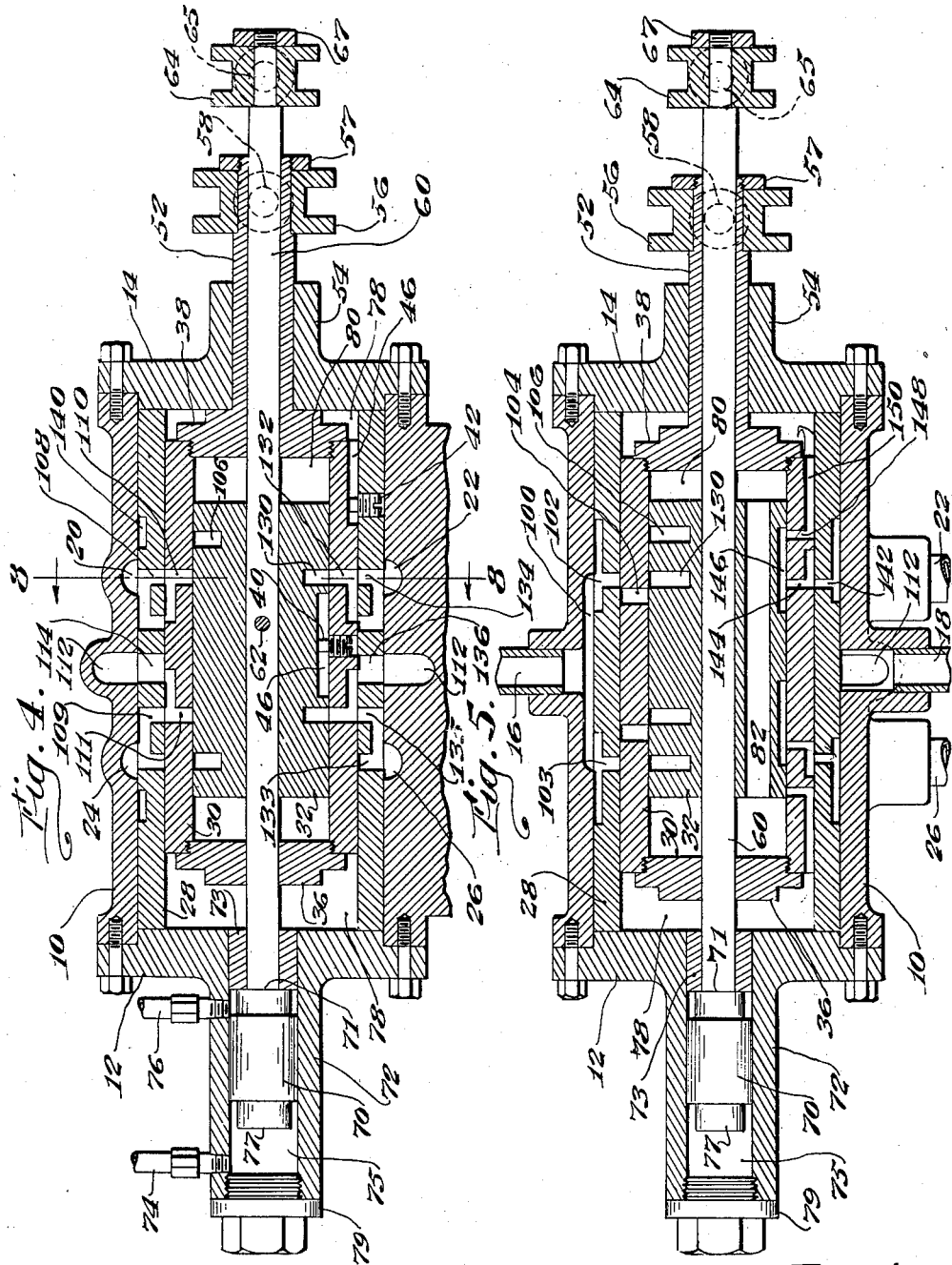
Inventor
Andrew S. Reid
by J. Stanley Churchill
Atty.

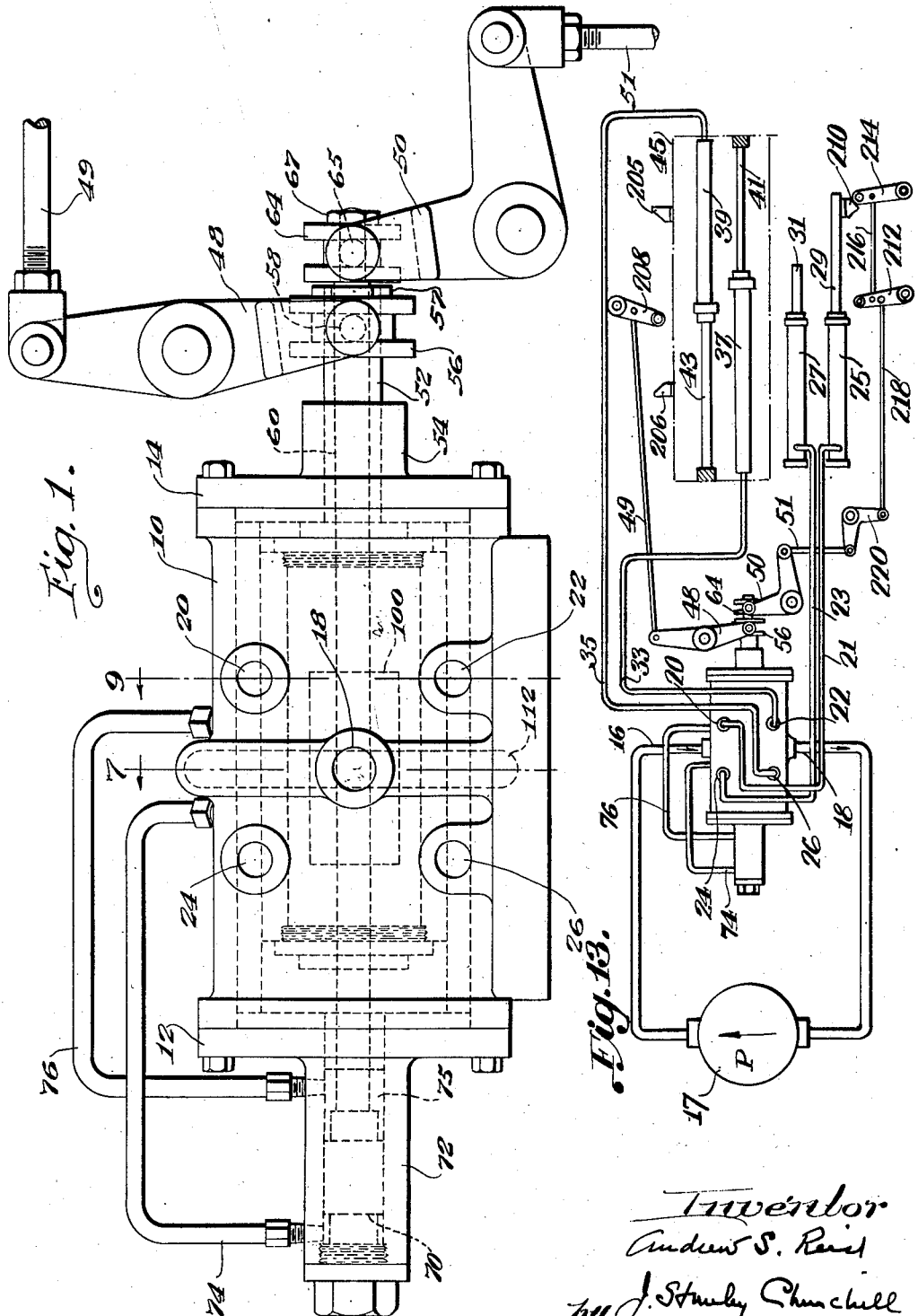

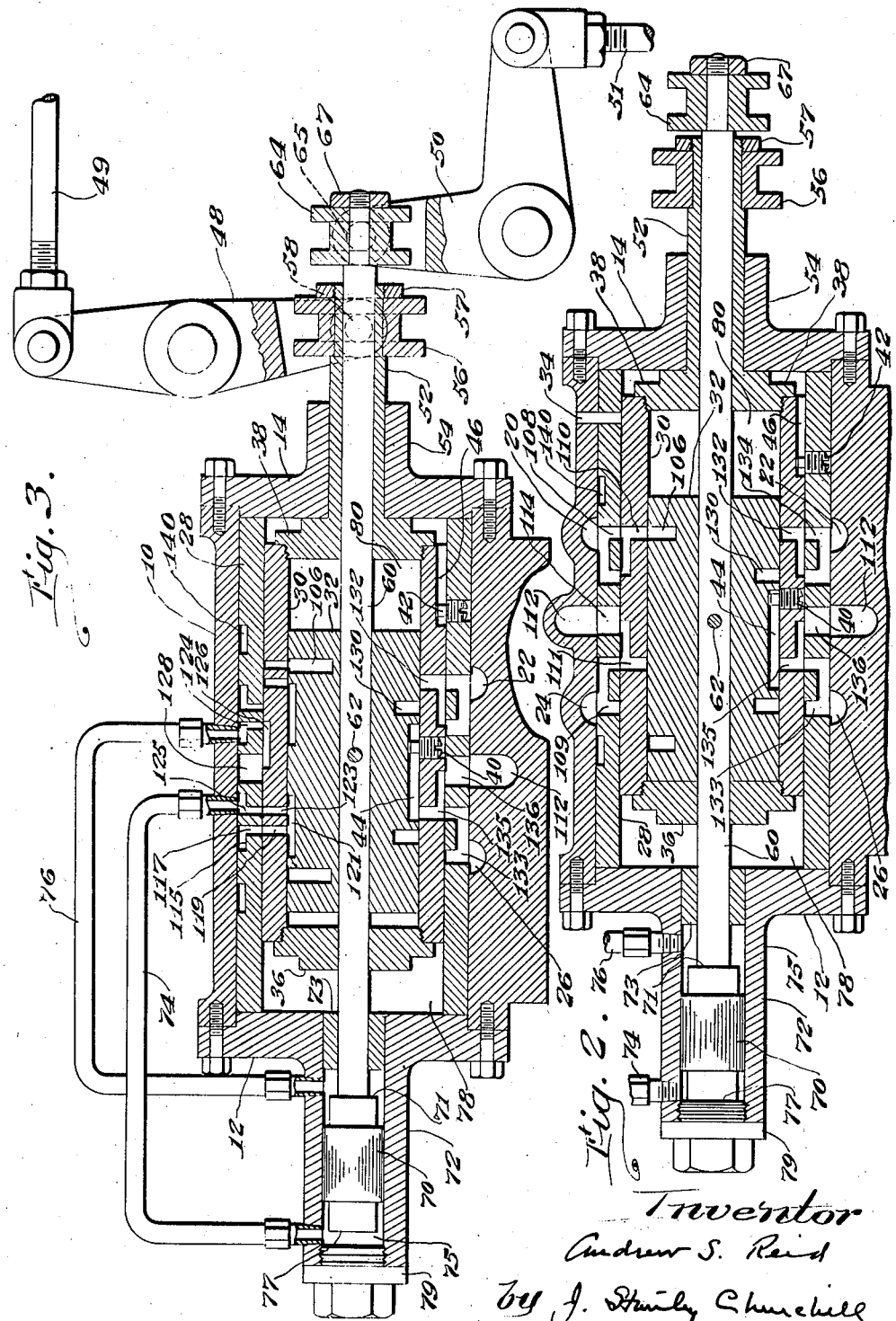

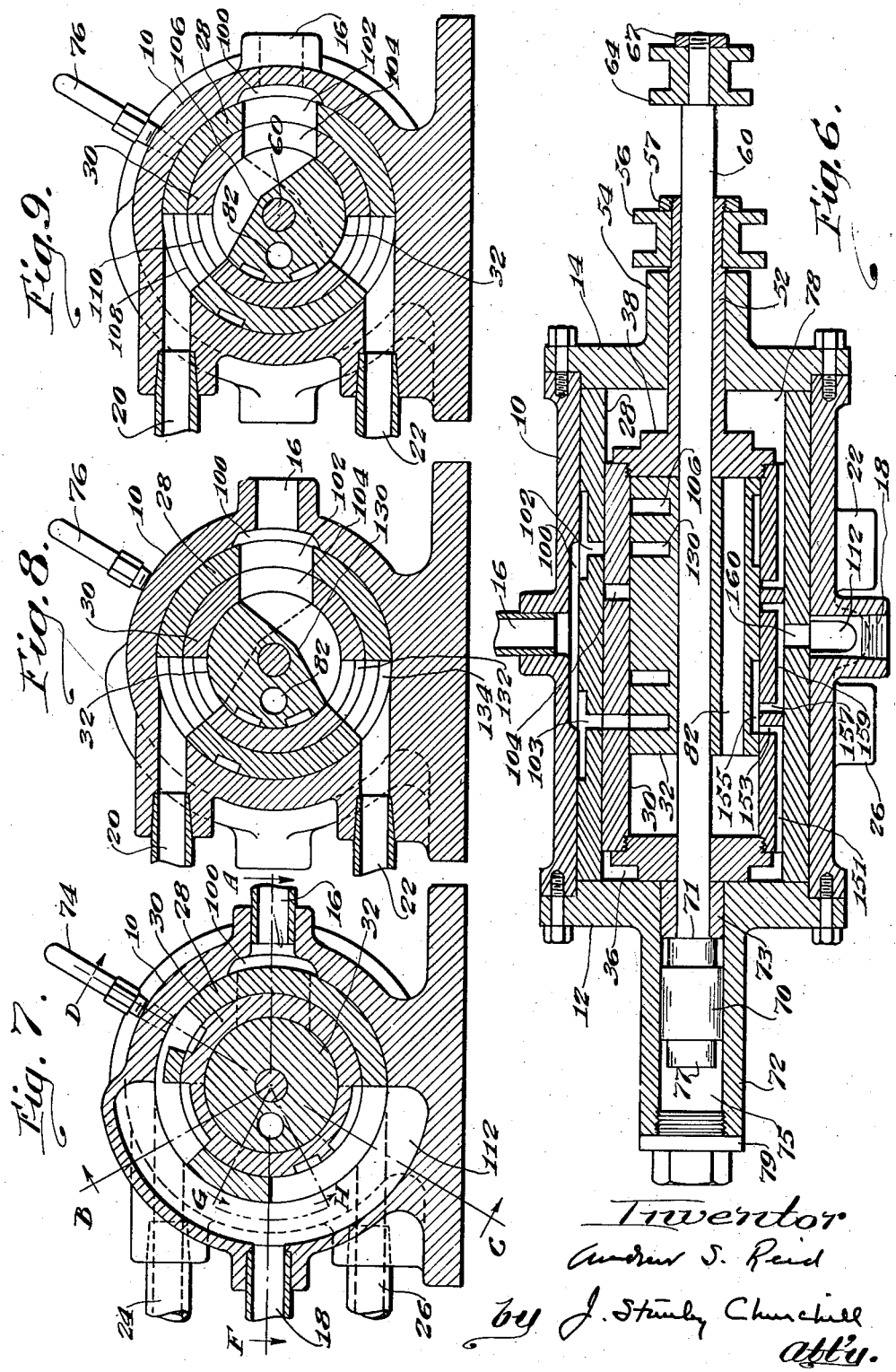

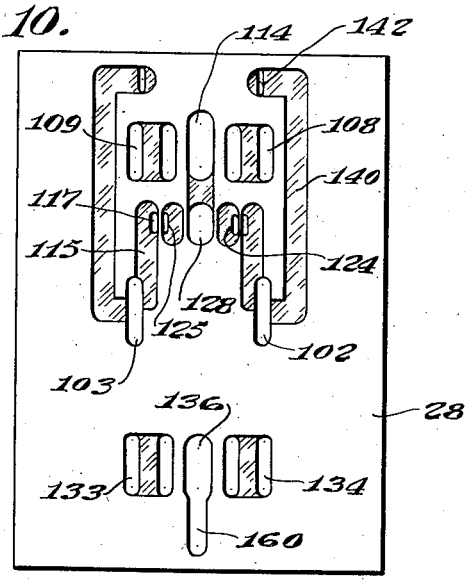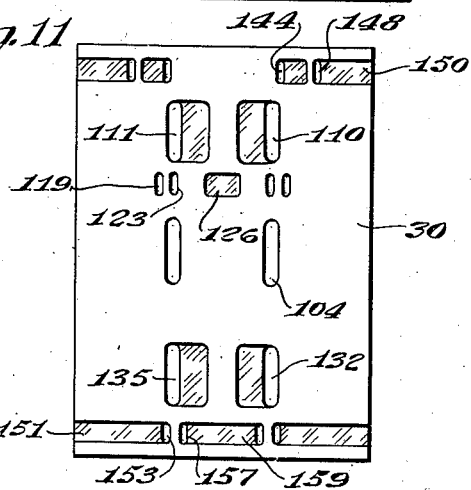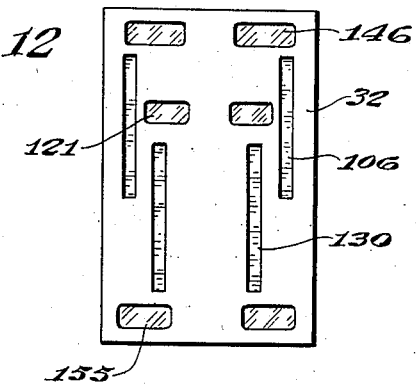

Patented Sept. 12, 1939

2,172,595

UNITED STATES PATENT OFFICE 2,172,595

CONTROL VALVE FOR HYDRAULICALLY OPERATED MACHINE TOOLS

Andrew S. Reid, Beverly, Mass.

Application December 17, 1937, Serial No. 180,384

8 Claims. (Cl. 121—45)

This invention relates to a control valve for controlling the flow of liquid to hydraulically operated machine tools or the like.

The invention has for one of its objects to provide a novel and improved control valve which may be used with advantage to control the flow of liquid in a novel and superior manner to and from a plurality of outlets connected to supply hydraulic pressure to the operating members of a machine tool.

Another object of the invention is to provide a novel machine tool of the type embodying a plurality of hydraulically actuated operating members in which provision is made for controlling the machine to insure predetermined successive operation of the operating members.

With these objects in view and such others as may hereinafter appear, the invention consists in the control valve and in the various structures, arrangements and combinations of parts hereinafter described and particularly defined in the claims at the end of this specification.

In the drawings illustrating the preferred form of the invention, Fig. 1 is a view in side elevation of a control valve embodying the present invention, viewing the outlet ports; Figs. 2, 3, 4, 5 and 6 are longitudinal cross-sectional views through the valve, illustrating the parts in different positions of operation, the sections being taken on different radial lines as viewed in Fig. 7 as follows: Fig. 2 on line B—C; Fig. 3 on line C—D; Fig. 4 on line B—C; Fig. 5 on line A—G—F and Fig. 6 on line A—H—F; Fig. 7 is a cross-sectional view taken on the line 7—7 of Fig. 1; Fig. 8 is a cross-sectional view taken on the line 8—8 of Fig. 4; Fig. 9 is a cross-sectional view taken on the line 9—9 of Fig. 1; Figs. 10, 11 and 12 are developed views of parts of the valve to be referred to and which illustrate the liquid escapement ports of the valve, and Fig. 13 is a diagrammatic view illustrating the connections between the control valve and the operating members of an hydraulically operated machine tool.

In general the present invention contemplates a control valve which is particularly adapted for use in controlling the operation of the operating members of hydraulically powered machine tools and particularly of those machine tools which require the movement of the work with relation to the cutting tool to perform the machining operation such as horizontal planers or grinders.

As an example of such hydraulically powered machine tools, reference may be had to U. S. Patent No. 1,925,908, to Andrew S. Reid, issued September 5, 1933.

In such hydraulically operated machine tools the work is set up in operating relation to the cutting tool and the work table is then reciprocated horizontally to perform the machining operation and, in a grinding machine, for example, the cutting tool or grinding wheel is advanced transversely with relation to the work after each longitudinal movement of the table. Both the work table and the cross-feed are operated hydraulically and it is the aim of the present invention to provide a valve for controlling the operation of these parts in such a manner as to insure successive operation of the work table and cross-feed and to eliminate any possibility of simultaneous or partially overlapping operation thus preventing cutting or grinding of the work in diagonal paths.

One of the practical difficulties experienced in prior control valves of the character of the present valve, resides in the fact that the ports of the valve members would not be definitely and positively aligned under all conditions of operation, such for example, as when changing from one rate of either the table movement or crossfeed movement to another. The actuating force for the table movement terminates as soon as the ports supplying hydraulic pressure for operating the table are cut off and before the full movement to the cross-feed ports is reached. Prior valves have depended upon the momentum of the operating member, such as the table or the crossfeed, after the pressure has been cut off by the control valve in order to complete the full movement of the valve members to change the alignment of the ports from one outlet to another. In practice it was found that when operating the table at low speeds such as from ten to twelve feet per minute the momentum of the table could not be depended upon to insure alignment of the ports because at this rate of speed, the table would practically come to a stop as soon as the pressure was cut off. The cross-feed usually operates at slow speed and consequently possesses little momentum.

The present invention contemplates the provision of auxiliary means for automatically moving the valve members from one supply outlet to another after the movement of one of the operating members has terminated thus eliminating the necessity of depending upon the momentum of the operating members of said machine tools and assuring positive and definite alignment of the different ports in the valve during the operation of the machine. Provision is also made for operatively connecting one operating member, such as the table feed, with the valve member which when moved at the end of the stroke of such operating member, serves to start the operation of the second operating member such as the cross-feed, thus insuring successive and not simultaneous operation.

Referring now to the drawings, in its preferred form the present control valve comprises a housing 10 enclosed at either end by flange members 12, 14 and provided with an inlet 16 for receiving liquid under pressure from any usual source, such as a pressure pump 17, and outlets 20, 22, 24, 26 for delivering the liquid to the mechanism for actuating the operative members of an hydraulically powered machine tool. A central outlet 18 is provided as a common exhaust outlet for the liquid being returned from the machine.

The housing 10 is provided with three cylindrical valve members 28, 30, 32, the outer member 28 comprising a stationary sleeve fixed in the housing by a pin 34. The intermediate valve member 30 comprises a sleeve slidingly fitted within the outer sleeve 28 and is enclosed at either end by the caps 36, 38. The remaining valve member 32 comprises a cylindrical member slidingly fitted within the sleeve 30.

Each valve member is provided with a plurality of ports and escapements, as will be described, and the two inner members 30, 32 are arranged to be moved longitudinally of the casing with relation to each other and with relation to the outer sleeve 28 so that in the operation of the valve the ports are successively aligned to permit the liquid being received at the inlet 16 to be delivered to the outlets 20, 22, 24 and 26. The movable valve members 30, 32 are retained in operative relation to each other and to the stationary member 28 by studs 40, 42 which fit into slots or keyways 44, 46 respectively, thus preventing rotary movement of the valve members.

During each cycle of operation of the control valve, the ports are successively aligned to deliver liquid to the outlets in the following sequence: first to outlet 20; second to outlet 22; third to outlet 24 and last to outlet 26. In its preferred form the control valve is arranged so that the first outlet 20 is operatively connected to the mechanism for actuating the cross-feed of a machine tool; the second outlet 22 actuates the table movement in one direction; the third outlet 24 advances the cross-feed again and the last outlet 26 moves the table in the opposite direction. As diagrammatically illustrated in Fig. 13, the outlets 20, 24 may be connected by discharge lines 21, 23, to the end of cylinders 25, 27 provided with pistons 29, 31 respectively. The pistons are adapted to be forced from the cylinders under the influence of the oil pressure from the pump 17 and the pistons may be operatively connected to the cross-feed of a machine tool in any usual or preferred manner such as that illustrated in the Reid patent above referred to. Similarly, the outlets 22, 26 may be connected by discharge lines 33, 35 to the end of cylinders 37, 39, respectively. The cylinders 37, 39 are provided with pistons 41, 43 respectively which may be directly connected with the work table 45 of a machine tool, indicated by dotted lines in Fig. 13.

Provision is made in the improved valve for initiating the movement of the valve members, when changing from one set of ports to another, by the movement of the operating members of the grinding machine or other hydraulically powered machine tool and as herein shown, the movable valve members 30, 32 are operatively connected to bell-cranks 48, 50 through connecting rods 49, 51 which are arranged to be operated by the movement of the work table and the cross-feed or tool carrying member, respectively of such hydraulically powered machines. As illustrated in Fig. 13, the initial movement of the bell-crank 48 may be effected through connections from the work table 45 and, as herein shown, the work table is provided with dogs 205, 206 which are arranged to engage a lever 208 and to rock the latter in the direction of movement of the table at or near the end of the working stroke of the latter. The lever 208 is connected by the rod 49 to the bell-crank 48 so that, in operation, the valve member 30 will be shifted to align a different set of ports, as will be described. Similarly, the initial movement of the bell-crank 50 may be effected through the cooperation of a dog 210, attached to the piston 29, with either of the levers 212, 214 which are operatively connected together by a link 216. The lever 212 is connected to the bell-crank 50 through the link 218, bell-crank 220 and link 51 so that in operation when the piston 29 nears the limit of its stroke in either direction, the bell crank 50 and the valve member 32 will be shifted accordingly. As illustrated herein, see Figs. 1 and 3, the movable sleeve 30 is connected to the bell-crank 48. The cap 38 is provided with a sleeve 52 which extends through a bearing 54 in the flange member 14 and is provided at its outer end with a grooved shifting collar 56 which cooperates with studs 58 fixed in the bell-crank 48. The collar is retained on the sleeve by a nut 57. The inner valve member 32 is connected to the bell-crank 50 and as herein shown, the member 32 is fixed to a rod 60 by a pin 62. The rod 60 extends through bearings in the caps 36, 38 and is provided at its outer end with a similar shifting collar 64 which cooperates with the studs 65 in the bell-crank 50. The collar is retained on the rod by a similar nut 67.

As above stated, the valve members 30, 32 are merely started in their movement from one position of alignment to another by the movement of the operating members of the machine tool. As will be described, the complete stroke or movement into alignment with a different set of ports is accomplished by auxiliary positively operating means which functions to move the valve members into definite positions entirely independently of variations in momentum of the machine tool operating members. As herein shown, such auxiliary means comprises fluid operated means connected to the valve members, and the operation thereof is controlled by a series of ports and escapements in the valve members as will be described. Thus, for example, in the present valve if the full movement from one position of alignment to another is assumed to be three quarters of an inch, and the initial movement is approximately one quarter of an inch, then the auxiliary means will move the valve members the remaining one half of an inch to complete the stroke.

Referring now to Fig. 3, as illustrated therein, the auxiliary movement of the inner member 32 is accomplished by means of pressure exerted by the liquid upon either face of a piston 70 which is fixed to the end of the rod 60. The piston 70 is slidingly fitted within a cylinder formed in the hub 72 of the flange member 12. The liquid is delivered from the valve through escapements, as will be described, and through either of the conduits 74, 76 to the piston chamber 75, each conduit alternately acting as a pressure conduit and as a relief or exhaust conduit.

The auxiliary movement of the movable sleeve 30 is accomplished by the application of liquid pressure directed into either end of the chamber 78, formed by the end flanges 12, 14 and the inside surface of the stationary sleeve 28. Suitable ports and escapements are provided in the valve members for alternately directing the liquid into either end of the chamber 78 and also for relieving or exhausting the liquid contained in the opposite end of the chamber.

As herein illustrated, the inner member 32 is movable longitudinally within a chamber 80 formed by the inside surface of the sleeve 30 and the end caps 36, 38. Although no pressure is directed into this chamber 80, yet any liquid locked in either end would tend to deter the movement of the cylinder 32 and in order to overcome this possibility a hole 82 is bored in the cylinder 32 to permit the liquid to escape from one end of the chamber 80 to the other during the movement of the valve members 30 and 32.

Referring now to Fig. 2 and to the developments in Figs. 10, 11 and 12, the flow of the liquid to the cross-feed outlet 20 will now be described. Assuming the valve members to be aligned in the position illustrated in Fig. 2, the liquid is received into the valve through the inlet 16 and into the cut out area 100 in the housing, see Fig. 9. The cut out area 100 communicates with ports 102, 103, (Figs. 5 and 6) in the stationary sleeve 28 and the port 102 communicates with a port 104 in the movable sleeve 30. The port 104 is in communication with a slot or cut-out portion 106 in the cylindrical member 32. The slot 106 is in alignment with ports 108, 110 in the valve members 28, 30 respectively, thus directing the liquid into the outlet 20 to operate the cross-feed.

During the movement of the cross-feed or during the time the liquid is directed through the outlet 20, the liquid previously delivered to the hydraulic mechanism is being returned through the opposite outlet 24. This returned liquid is disposed of through an exhaust chamber 112 cut in the housing 10 and into the common outlet 18. As illustrated in Fig. 2, the course of the liquid before entering the exhaust chamber is through the ports 109, 111 in the valve members 28, 30 respectively, and thence upwardly through an exhaust port 114 which communicates with the exhaust chamber 112.

In the operation of the control valve, at the end of the movement of the cross-feed, the bell-crank 50 effects the movement of the movable member 32 from the position illustrated in Fig. 2 to the position illustrated in Fig. 3. This movement cuts off the flow through the outlet 20 leading to the cross-feed actuating mechanism and aligns an auxiliary set of ports or escapements for completing the movement of the valve member 32 to the next position of discharge, i. e. to the outlet 22 leading to the table actuating mechanism. As shown in Fig. 3, when the valve members are in the position illustrated, liquid is directed under pressure from an inlet 16 and into the chamber 75. The ports and escapements through which the liquid travels are as follows: from the area 100 the liquid enters the port 103 and follows a channel 115 around the outer sleeve 28 and through an escapement 117; the escapement 117 is in alignment with an escapement 119 in the sleeve 30 which communicates with a groove 121 in the inner member 32; the liquid then travels upwardly again through similar escapements 123, 125 which are in communication with the conduit 74.

During the above described movement, the liquid in the opposite end of the chamber 75 is being transferred to the common outlet 18 through the conduit 76, through the escapement 124 and into a groove 126 which communicates with an exhaust port 128 and the exhaust chamber 112.

In order to limit the movement of the valve member 32 with relation to the member 30 so that the ports will be in definite alignment, the face 71 of the piston 70 is arranged to engage the end of a bushing 73 in the flange 12, as illustrated in Fig. 4. Movement of the piston 70 in the other direction is terminated by engagement of the face 77 with the inside of the cap 79 enclosing the chamber 75.

The above described operation completes the movement of alignment to the next position of discharge and the valve members are now in the position illustrated in Fig. 4 wherein the ports are aligned to deliver the liquid under pressure to the table movement outlet 22. Referring now to Figs. 4 and 8, the liquid enters the ports 102, 104 and is directed downwardly through a slot 130 in the valve member 32 and thence through ports 132, 134 and into the outlet 22 in a manner similar to the discharge through the outlet 20. Likewise, the liquid returned through the outlet 26 is delivered to the exhaust chamber 112 through the ports 133, 135 and 136 to be discharged through the common exhaust outlet 18.

At the end of the table movement stroke the sleeve 30 is given an initial movement such, for example, as one quarter of an inch, through the bell-crank 48 which movement operates to cut off the flow to the discharge outlet 22 and aligns a set of auxiliary ports to effect the completion of the valve movement to the next position of discharge, that is, through the outlet 24 leading to the second end of the cross-feed actuating mechanism. The position of initial movement of the sleeve 30 is illustrated in Fig. 5 and as therein shown the auxiliary ports are in alignment to apply liquid pressure into the right hand end (Figs. 5 and 6) of chamber 78. The liquid entering the inlet 16 and area 100 is diverted into a channel 140 around the sleeve 28 and through an escapement 142 which is in alignment with an escapement 144 and groove 146. The groove 146 in the valve member 32 communicates with a port 148 and channel 150 which leads into one end of the chamber 78.

During the movement of the sleeve 30 from the position illustrated in Fig. 5 to the position illustrated in Fig. 6, the liquid contained in the other end of the chamber 78 is being discharged into the common exhaust outlet 18 through a channel 151, escapement 153, groove 155, escapement 157 and channel 159 which communicates with the lower portion 160 of the exhaust port 136 and the exhaust chamber 112. As illustrated in Fig. 6, the movement of the sleeve 30 is terminated by the engagement of the cap 36 with the inside face of the flange 12 in order to secure positive alignment with the new set of ports for discharge through outlet 24. Movement of the sleeve 30 in the other direction is limited in a similar manner by engagement of the cap 38 with the inner face of the flange 14.

In the position illustrated in Fig. 6, the ports are in alignment to discharge liquid through the second cross-feed outlet 24 through ports similar to those supplying the outlet 20 and which are symmetrically arranged as will be apparent from an inspection of the developed views of the ports as shown in Figs. 10, 11 and 12. Since the remaining discharge outlet 26 leading to the hydraulic mechanism for actuating the return stroke of the table receives liquid through ports similar to those for the outlet 22 and which are arranged symmetrically in the valve members, it is thought that the above description of the various ports and escapements is sufficient for a complete understanding of the present invention.

Thus, it will be seen that the control valve of the present invention will automatically align itself to a different set of ports after an initial movement of the movable members of said valve has been effected.

From the above description it will be seen that the control valve of the present invention is adapted to control the flow of liquid under pressure to and from a plurality of outlets connected to supply hydraulic pressure to the mechanism for actuating the operating members of an hydraulically powered machine tool in a novel and improved manner. It will also be seen that in the operation of the improved valve, a definite sequence of operations is assured so that the table movement must be completed before a cross-feed movement is started and conversely the cross-feed movement must be completed before table movement can be started, thereby preventing the operation of the cross-feed while the cutting tool is still in contact with the work. It will be further seen that the resetting feature of the present control valve eliminates the uncertainty of depending upon the momentum of the operating members to change the alignment from one set of ports to another to the end that definite alignment is assured regardless of the speed of the table movement.

While the preferred embodiment of the invention has been herein illustrated and described as embodied in a valve of cylindrical construction, it will be understood that the invention may be embodied in other forms within the scope of the following claims.

Having thus described the invention, what is claimed is:

1. The combination with two operating members of an hydraulically operated machine tool, of a control valve for controlling the flow of the actuating liquid to said operating members, said control valve comprising a valve housing having an inlet and a plurality of outlets, said outlets being connected to their respective operating members of the machine tool, two valve members within the valve housing movable with relation to each other and provided with a plurality of ports for establishing fluid connections between the inlet and predetemined different ones of said outlets when the valve members are moved into different positions, means rendered operative at the end of the operating stroke of each operating member of the machine tool for moving the corresponding valve member into a position to cut off the fluid pressure and flow to the corresponding operating member, and means rendered operative by the initial movement of each valve member for completing the movement of such valve member into a position to establish communication between the liquid inlet and a second outlet whereby to enable operation of the second operating member to commence after completion of the operating stroke of the first operating member.

2. The combination with two operating members of an hydraulically operated machine tool, of a control valve for controlling the flow of the actuating liquid to said operating members, said control valve comprising a valve housing having an inlet and a plurality of outlets, said outlets being connected to their respective operating members of the machine tool, two valve members within the valve housing movable with relation to each other and provided with a plurality of ports for establishing fluid connections between the inlet and different ones of said outlets when the valve members are moved into predetermined different positions, means rendered operative at the end of the operating stroke of each operating member of the machine tool for moving the corresponding valve member into a position to cut off the fluid pressure and flow to the corresponding operating member, fluid operated means operative by such initial movement of each valve member for hydraulically completing the movement of such valve member into a position to establish communication between the liquid inlet and a second outlet whereby to enable operation of the second operating member to take place after the completion of the stroke of the first operating member.

3. The combination with two operating members of an hydraulically operated machine tool, of a control valve for controlling the flow of the actuating liquid to said operating members, said control valve comprising a valve housing having an inlet and a plurality of outlets, said outlets being connected to their respective operating member of the machine tool, two valve members within the valve housing movable with relation to each other and provided with a plurality of ports for establishing fluid connections between the inlet and different ones of said outlets when the valve members are moved into different positions, means rendered operative at the end of the operating stroke of each operating member of the machine tool for moving the corresponding valve member into a position to cut off the fluid pressure and flow to the corresponding operating member, separate fluid operated means for hydraulically completing the movement of such valve member into a position to establish communication between the liquid inlet and a second outlet to thereby initiate the operation of the second operating member and connections for operating each of said separate fluid operated means rendered operative by the initial movement of said valve.

4. The combination with two operating members of an hydraulically operated machine tool, of a control valve for controlling the flow of the actuating liquid to said operating members, said control valve comprising a valve housing having an inlet and a plurality of outlets, said outlets being connected to their respective operating member of the machine tool, two valve members within the valve housing movable with relation to each other for establishing fluid connections between the inlet and predetermined different ones of said outlets when the valve members are moved into different positions, means rendered operative at the end of the operating stroke of each operating member of the machine tool for moving the corresponding valve member into a position to cut off the fluid pressure and flow to the corresponding operating member, and means rendered operative by the initial movement of each valve member for completing the movement of such valve member into a position to establish communication between the liquid inlet and a second outlet whereby to enable operation of the second operating member to commence after completion of the operating stroke of the first operating member.

5. The combination with two operating members of an hydraulically operated machine tool, of a control valve for controlling the flow of the actuating liquid to said operating members, said control valve comprising a valve housing having an inlet and a plurality of outlets, said outlets being connected to their respective operating members of the machine tool, two valve members within the valve housing movable with relation to each other and provided with a plurality of ports for establishing fluid connections between the inlet and predetermined different ones of said outlets when the valve members are moved into different positions, means rendered operative at the end of the operating stroke of each operating member of the machine tool for moving the corresponding valve member into a position to cut off the fluid pressure and flow to the corresponding operating member and means rendered operative by the initial movement of each valve member for completing the movement of such valve member into a position to establish communication between the liquid inlet and a second outlet whereby to enable operation of the second operating member to commence after completion of the operating stroke of the first operating member, said control valve having provision for receiving and disposing of the fluid used to actuate the operating members during the preceding cycle of operation.

6. The combination with two operating members of an hydraulically operated machine tool, of a control valve for controlling the flow of the actuating liquid to said operating members, said control valve comprising a valve housing having an inlet and a plurality of outlets, said outlets being connected to their respective operating members of the machine tool, two valve members within the valve housing movable with relation to each other and provided with a plurality of ports for establishing fluid connections between the inlet and predetermined different ones of said outlets when the valve members are moved into different positions, means rendered operative at the end of the operating stroke of each operating member of the machine tool for moving the corresponding valve member into a position to cut off the fluid pressure and flow to the corresponding operating member, and means independent of said operating member of the machine tool rendered operative by the initial movement of each valve member for completing the movement of such valve member into a position to establish communication between the liquid inlet and a second outlet whereby to enable operation of the second operating member to commence after completion of the operating stroke of the first operating member.

7. In a control valve particularly adapted for use in controlling the flow of the actuating liquid to an hydraulically operated machine tool of the type provided with two operating members, a valve housing having an inlet and a plurality of outlets adapted for connection to their respective operating members of the machine tool, two valve members within the valve housing movable with relation to each other and provided with a plurality of ports adapted to establish fluid connections between the inlet and different ones of said outlets when the valve members are moved into different positions, means adapted to be rendered operative at the end of the operating stroke of each operating member of the machine tool adapted to move the corresponding valve member into a position to cut off the fluid pressure and flow to the corresponding operating member, and means rendered operative by the initial movement of said valve members adapted to complete the movement of the corresponding valve member into a position to establish communication between the liquid inlet and a second outlet whereby to enable operation of the second operating member to commence only after completion of the operating stroke of the first operating member.

8. In a control valve particularly adapted for use in controlling the flow of the actuating liquid to an hydraulically operated machine tool of the type provided with two operating members, a cylindrical valve housing having an inlet and a plurality of outlets adapted for connection to their respective operating members of the machine tool, two cylindrical valve members, one within the other and both within the housing and movable with relation to each other and to the housing, said valve members being provided with a plurality of ports adapted to establish fluid connections between the inlet and different ones of said outlets when the valve members are moved into different positions, means adapted to be rendered operative at the end of the operating stroke of each operating member of the machine tool adapted to move the corresponding valve member into a position to cut off the fluid pressure and flow to the corresponding operating member, an auxiliary fluid operated means rendered operative by the initial movement of said valve member adapted to complete the movement of the corresponding valve member into a position to establish communication between the liquid inlet and a second outlet whereby to enable the operation of the second operating member to commence only after the completion of the operating stroke of the first operating member.

ANDREW S. REID.